United States Patent [19]

Salton et al.

[11] Patent Number: 4,834,934
[45] Date of Patent: May 30, 1989

[54] THIMBLE GRIP FUEL ASSEMBLY HANDLING TOOL

[75] Inventors: Robert B. Salton, Plum Boro; Leonard P. Hornak, Forest Hills; James R. Marshall; Robert E. Meuschke, both of Penn Hills, all of Pa.

[73] Assignee: Westinghouse Electric Corp., Pittsburgh, Pa.

[21] Appl. No.: 152,285

[22] Filed: Feb. 4, 1988

[51] Int. Cl.$^4$ .............................................. G21C 19/00
[52] U.S. Cl. ..................................... 376/271; 294/906
[58] Field of Search ............... 376/271, 268, 264, 262, 376/261; 294/906, 100, 102.1; 29/723

[56] References Cited

U.S. PATENT DOCUMENTS

| 3,383,286 | 5/1968 | Paget | 376/261 |
|---|---|---|---|
| 3,733,250 | 5/1973 | Van Santen et al. | 376/268 |
| 3,768,668 | 10/1973 | Schukei | 376/271 |
| 3,904,048 | 9/1975 | Van Santen et al. | 376/268 |
| 4,086,132 | 4/1978 | Meuschke et al. | 376/261 |
| 4,180,435 | 12/1979 | Shumyakin et al. | 376/261 |
| 4,236,966 | 12/1980 | Savin et al. | 376/261 |
| 4,236,967 | 12/1980 | Batjukov et al. | 376/261 |
| 4,244,616 | 1/1981 | Buchalet | 294/906 |
| 4,279,699 | 7/1981 | Kuhn | 376/260 |
| 4,297,776 | 11/1981 | Fogg | 376/261 |
| 4,311,557 | 1/1982 | Kowalski et al. | 376/271 |
| 4,358,421 | 11/1982 | Jabsen | 376/271 |
| 4,374,801 | 2/1983 | Albin | 376/271 |
| 4,511,531 | 4/1985 | Swidwa et al. | 376/262 |
| 4,551,299 | 11/1985 | Shields | 376/261 |
| 4,609,219 | 9/1986 | Go | 294/906 |
| 4,643,472 | 2/1987 | Schukei et al. | 294/906 |
| 4,643,868 | 2/1987 | Bollinger | 376/262 |
| 4,645,256 | 2/1987 | Zeh | 294/906 |
| 4,647,424 | 3/1987 | Meuschke et al. | 376/264 |
| 4,651,400 | 3/1987 | Shields | 376/261 |
| 4,663,114 | 5/1987 | Cransac et al. | 376/271 |
| 4,690,593 | 9/1987 | Nee et al. | 376/260 |
| 4,715,111 | 12/1987 | Kapoor et al. | 376/271 |
| 4,772,446 | 9/1988 | Meuschke | 376/262 |
| 4,774,752 | 10/1988 | Cooper, Jr. et al. | 376/261 |

Primary Examiner—Deborah L. Kyle
Assistant Examiner—Daniel Wasil
Attorney, Agent, or Firm—Michael G. Panian

[57] ABSTRACT

A thimble grip fuel assembly handling tool (20) for transporting fully loaded fuel assemblies (52) is disclosed. The tool (20) comprises an elongated mast (23) slidingly disposed within an elongated cylinder (113), the cylinder being of a length less than the mast (23) such that the tool defines a mast fill-up position (126) and a mast full-down position (128). A cage (110) assembly acts to protect the gripping means (32) when the tool is transported in the mast full-up position (126). The gripping means (32) is comprised of a plurality of gripping members (49) which grip the inside diameter of control rod guide thimbles (50). The load path is distributed in the tool such that when the fuel assembly (52) secured to the gripping means (32) is raised, the weight of the fully loaded fuel assembly (52) acts to increase the gripping force on the fuel assembly. A number of indicators on the tool act to indicate to an operator: when the tool is in the mast full-down position; when the gripping members (49) have been fully actuated; and if there is any slipping of the gripping members within the fuel assemblies. The tool also includes a secondary gripping mechanism which engages the top nozzle of the fuel assembly.

35 Claims, 7 Drawing Sheets

THIMBLE GRIP FUEL ASSEMBLY HANDLING TOOL

TECHNICAL FIELD

The invention relates to equipment used to transport nuclear fuel assemblies, and more particularly to a thimble grip fuel assembly handling tool for transporting fully loaded fuel assemblies.

BACKGROUND OF THE INVENTION

Figure 11:
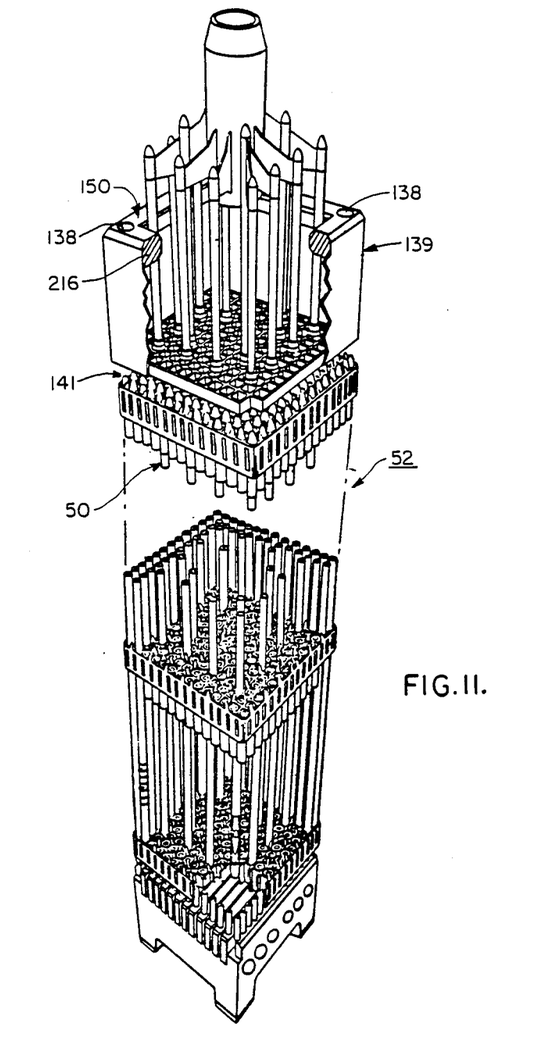
FIG. 11 is an elevational view of one design of a typical fuel assembly with an associated control rod assembly of a pressurized water reactor.

In a nuclear reactor power plant, one design of a fuel assembly is comprised of a plurality of fuel elements or rods oriented in a square-shaped array. For a typical pressurized water reactor, there are on the order of about 200 of these elongated fuel rods in each fuel assembly (see FIGS. 11 and 12). At either end of the fuel assembly is a top and bottom nozzle which direct the flow of coolant, typically water, through each fuel assembly. Interspersed among the fuel rods are hollow tubes, or thimbles, into which control rods are inserted from time to time to control the rate of nuclear reactions taking place. Positioned along the length of the fuel assembly are grids which help align and support fuel and control rods. Altogether, this fully loaded assembly can weigh on the order of 545 kg. (1200 lbs.).

To provide for a singular unit, the ends of the control rod guide tubes or thimbles are secured to the top and bottom nozzles. To accomplish this, typically, a stainless steel tube projecting from a nozzle is secured around each of the control rod guide thimbles. The guide thimbles are made of a special material which does not readily absorb neutrons developed by Westinghouse, Zircaloy. To secure the top nozzle to these guide thimbles, conventional methods such as welding cannot be used. Thus the thimble tubes are secured to the stainless steel tubes of the top nozzle by radially crimping the tubes together, usually at three axial locations, to secure the top nozzle to the fuel assembly.

Due to extended storage periods, spent fuel assemblies that have been stored in liquid, usually water, may have experienced corrosion, thereby rendering their removal by originally contemplated means impractical. Initially, the spent fuel assemblies were to have been transported in the same manner as fresh or new fuel assemblies are: via a tool which attaches to the nozzle at the top of the assembly. This method would allow the bulk of the assembly's mass to hang from the guide tubes, which are suspected of corrosion. The crimped segments below the nozzle are at risk of being torn by the weight of the assembly itself, if the assembly is lifted by the nozzle. Various tools and methods have been developed to transport a fuel assembly skeleton, or one which has had the nozzles and fuel rods removed therefrom, but are not capable of handling a fully loaded fuel assembly. Since these spent fuel assemblies are stored in a spent fuel pool which can be about 10 m (32 ft.) deep, an operator of such a tool should be able to be confident that a fuel assembly on the remote end has been effectively gripped for safe handling. Because of this risk, a tool capable of lifting the full weight of the assembly, without overly stressing the crimped segment, is desirable.

It is thus an object of the present invention to provide an apparatus which is capable of lifting and transporting fully loaded fuel assemblies.

It is another object of the present invention to provide such a lifting device which will not overly stress components of the fuel assembly.

It is a further object of the present invention to provide an apparatus which will give a positive indication to an operator of a correct positioning of the device.

It is a still further object of the present invention to provide an apparatus which will indicate to the operator when a fuel assembly has been properly gripped, and to continue to monitor the integrity of the grip while transporting a fuel assembly.

DISCLOSURE OF THE INVENTION

The above objects are obtained by the present invention, according to which, briefly stated, an apparatus for lifting a fully loaded fuel assembly of a nuclear reactor having a top nozzle and a plurality of control rod guide tubes therein, said apparatus having a fuel assembly gripping means comprised of a lift plate, an actuating plate disposed in spaced relationship below the lift plate and vertically movable relative thereto; and a plurality of gripping members operably associated with the lift plate and the actuating plate. The gripping members further include: a generally cylindrical vertical rod having a first frustoconical surface formed at its lower end, the rod being fixedly secured near its top end to the lift plate and projecting downward therefrom through an associated aperture in the actuating plate, a generally cylindrical, elastically deformable vertical sleeve having a bore therethrough with a first inner diameter, said sleeve essentially consisting of five vertically oriented annular sections: (i) a top disc-shaped section having a second inner diameter somewhat greater than the first inner diameter; (ii) a first generally cylindrical section immediately below the disc-shaped section, the first cylindrical section having a third inner diameter greater than the second inner diameter, and thereby defining a lower shoulder on the disc-shaped section at the top of the sleeve; (iii) a first bevelled inside surface below the first generally cylindrical section; and iv) a second bevelled inside surface at the bottom end of the sleeve, thereby defining a second generally cylindrical section between the first and second bevelled inside surfaces, the second cylindrical section having a diameter substantially equal to the first inner diameter; and a generally cylindrical, vertical gripper actuator concentrically disposed about the rod and within the sleeve, the gripper actuator being secured near its upper end to the actuating plate and having a second frustoconical surface formed at its lower end for slidingly engaging the first bevelled inside surface, and a generally cylindrical outwardly projecting annular flange having an upper surface disposed above the second frustoconical surface, whereby the sleeve vertically extends from the top section above the annular flange over the second frustoconical surface to the first frustoconical surface of the vertical rod.

BRIEF DESCRIPTION OF THE DRAWINGS

The invention will become more apparent by reading the following detailed description in conjunction with the drawings, which are shown by way of example only, wherein.

DESCRIPTION OF THE PREFERRED EMBODIMENT

Figure 1:
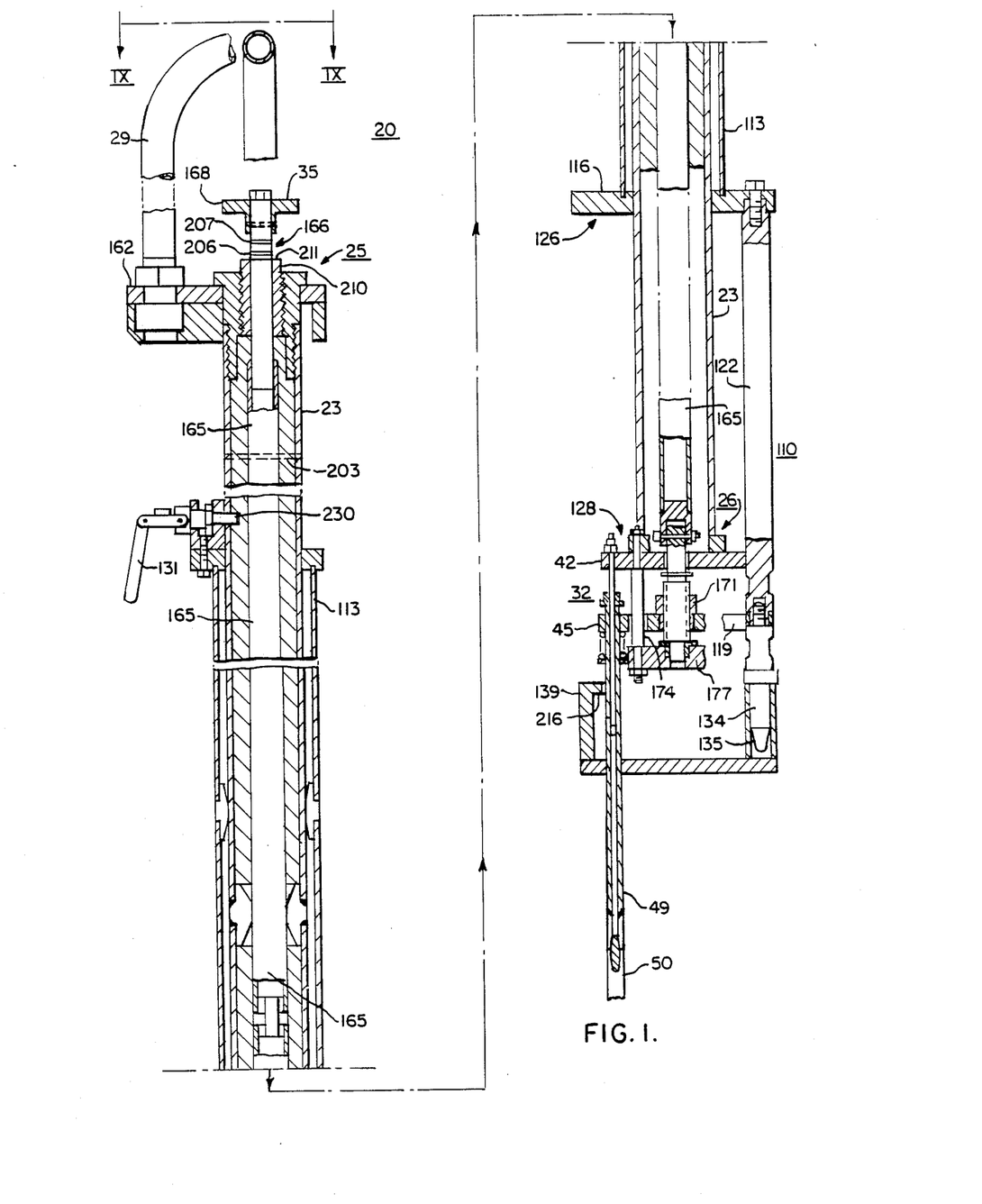
FIG. 1 is a front, elevational view of the fuel assembly thimble grip handling tool general assembly.
Figure 2:
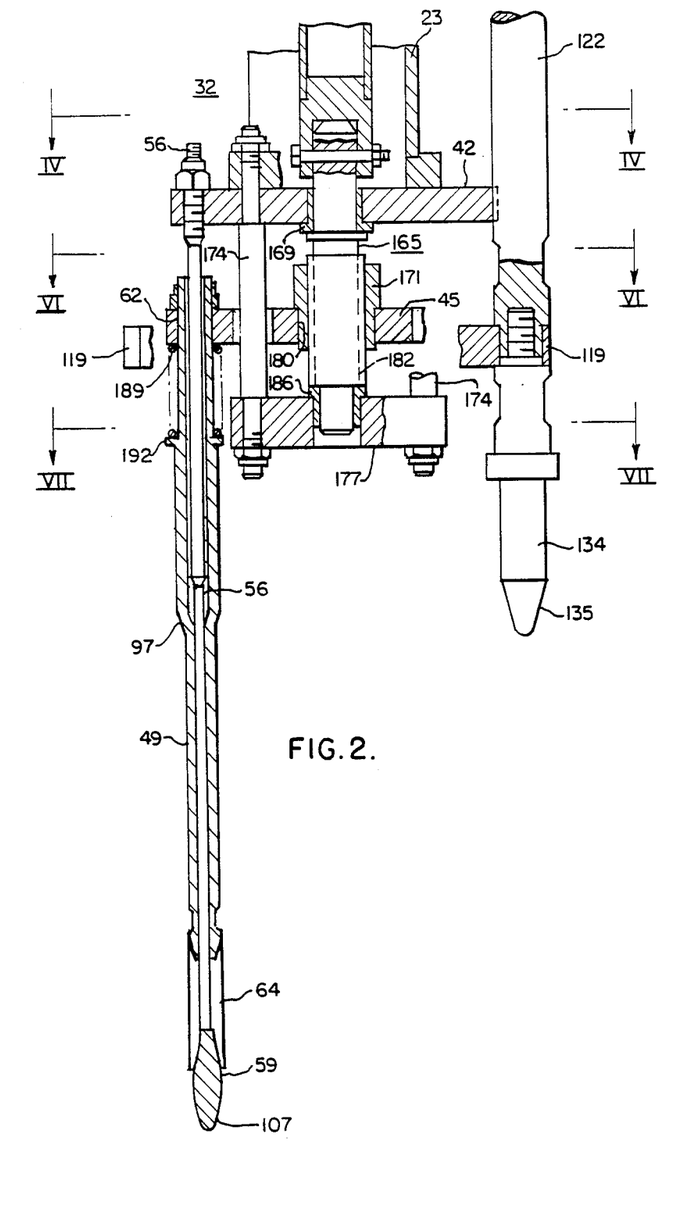
FIG. 2 is an enlarged view of the lower assembly showing the gripping means.

Referring now to the drawings in detail, FIG. 1 shows a general assembly of a tool 20 which is comprised of an elongated mast 23 having an upper and lower portion, generally designated at 25 and 26, respectively. A supporting means or lifting bail 29 is attached to the upper portion 25 and a fuel assembly gripping means, generally designated at 32, is secured to the lower portion 26. An actuating means 35 for the gripping means 32 is operably associated with a lift 42 and actuating plate 45.

The fuel assembly gripping means 32, shown in an enlarged, detailed view in FIGS. 2 through 8, is comprised of a lift plate 42 which is fixedly secured to the lower portion 26 of the elongated mast 23. An actuating plate 45 is disposed in spaced relationship below the lift plate 42 and vertically movable relative thereto. One or more gripping members 49 adapted to be received within control rod guide tubes or thimbles 50, are operably connected to the lift 42 and actuating plates 45 and project downward therefrom. The actuating means 35 is operably associated with said lift 42 and actuating 45 plates in such a manner that said gripping members 49 are in a gripping position when the actuating plate 45 is translated downward relative to the lift plate 42, and in a release position when the actuating plate 45 is correspondingly translated upward. Preferably, there are six gripping members 49 to securely transport a fully loaded fuel assembly 52.

Figure 3:
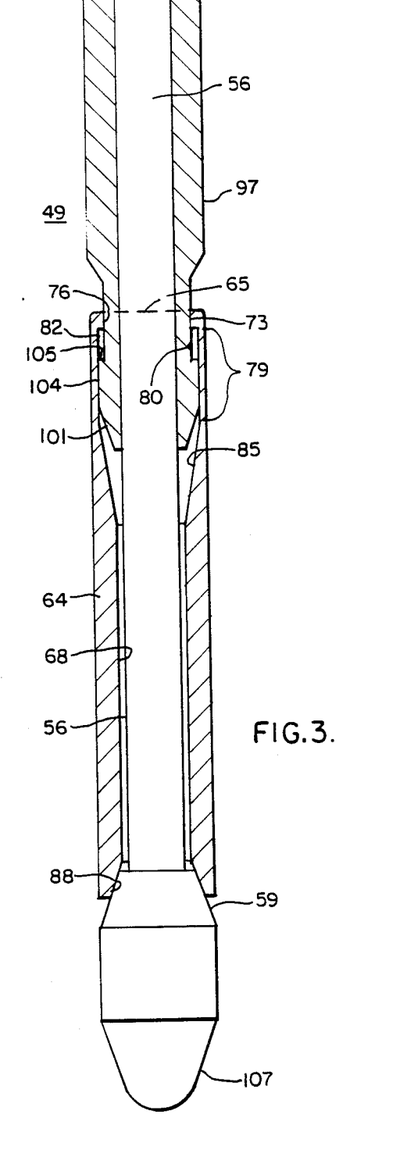
FIG. 3 is an enlarged view of the lower end of the gripping means of FIG. 2.
Figure 3A:
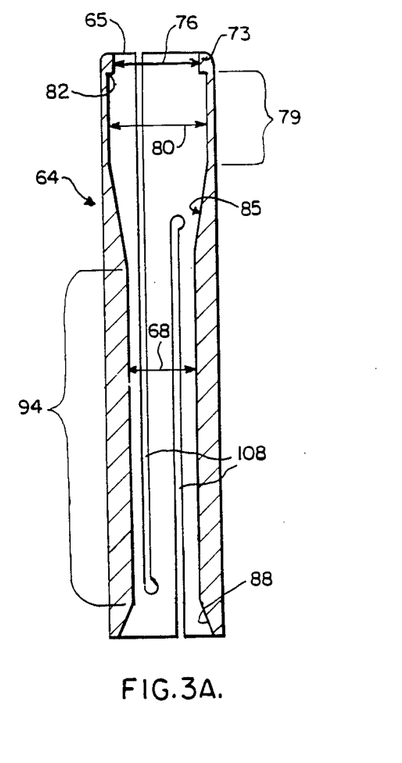
FIG. 3A is a detailed view of FIG. 3.
Figure 4:
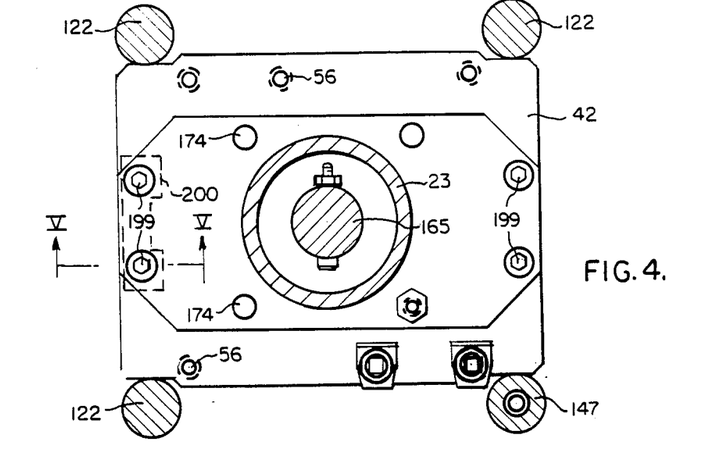
FIG. 4 is a view taken along the lines IV—IV of FIG. 2.
Figure 5:
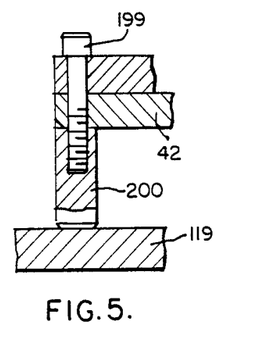
FIG. 5 is a sectional view taken along the lines V—V of FIG. 4.

Each gripping member 49 (FIG. 3) is further comprised of a generally cylindrical vertical rod 56 having a first frustoconical surface 59 near its lower end, said gripper rod 56 being fixedly secured near its top end to the lift plate 42 and projecting downward therefrom through an associated aperture 62 in the actuating plate 45. A generally cylindrical, elastically deformable vertical sleeve 64 having a bore 65 therethrough with a first inner diameter 68 is disposed on the lower end of the vertical gripper rod 56. The sleeve 64 essentially consists of five vertically oriented annular sections, a top disc-shaped section 73 having a second inner diameter 76 somewhat greater than the first diameter 68;

a first generally cylindrical section 79 immediately below the disc-shaped section 73, the first cylindrical section 79 having a third inner diameter 80 greater than the first 68 and second 76 inner diameters such that the second 76 is greater than the first 68, but less than the third 80, and thereby defining a lower shoulder 82 on the disc-shaped section 73 at the top of the sleeve 64;

a first bevelled inside surface 85 below said first generally cylindrical section 79;

and a second bevelled inside surface 88 at the opposite or bottom end of the sleeve 64 thereby defining a second generally cylindrical section 94 between said first 85 and second 88 bevelled inside surfaces; the second generally cylindrical section 94 having a diameter substantially equal to the first inner diameter 68. A generally cylindrical vertical gripper actuator 97 is concentrically disposed about the gripper rod 56 and within a top portion of the bore 65 of sleeve 64, the gripper actuator 97 being secured near its upper end to the actuating plate 45 and having a second frustoconical surface 101 formed at its lower end for slidingly engaging said first bevelled inside surface 85, and a generally cylindrical annular flange 104 having an upper surface 105 disposed above the second frustoconical surface 101. In this configuration, the sleeve 64 vertically extends from the top disc-shaped section 73 above the annular flange 104, over the second frustoconical surface 101, to the first frustoconical surface 59 of the gripper rod 56. Preferably the lower end of the vertical gripper rod 56 below the first frustoconical surface 59 terminates in a bullet-nosed tip 107, said tip thereby facilitating insertion of the gripping members 49 into the control rod guide thimbles 50.

The gripper actuator 97 is vertically slidable with respect to the gripper rod 56, whereby the gripper actuator 97 is translated downward when the actuating plate 45 is so translated by the actuator means 35, thereby radially expanding the elastically deformable sleeve 64 by means of the second frustoconical surface 101 slidingly engaging the first bevelled inside surface 85 and the second bevelled inside surface 88 slidingly engaging the first frustoconical surface 59. Preferably, the first 59 and second 101 frustoconical surfaces and the first 85 and second 88 bevelled surfaces each have an included angle of about 16°. The sliding engagement of the respective frustoconical 59, 101 and bevelled 88, 85 surfaces results in a radially outward expansive force on the inner surface of the sleeve 64, thereby radially expanding the outer surface of the sleeve 64 into gripping engagement with the inside diameter of the control rod guide tube 50. The sleeve 64 has a plurality of radially oriented vertical slits 108 therein, enabling the sleeve 64 to radially expand. The slits 108 alternately extend from the upper end to about the second bevelled inside surface 88 at the bottom end, and from the bottom end to about the first bevelled inside surface 85 near the upper end.

One of the main features of the tool 20, which prevents the fuel assembly 52 from slipping off the gripping members 49 during lifting as would occur in a conventional tool, is evidenced by the redistribution of the load path. When a fuel assembly has been gripped by the sleeve 64, and the fuel assembly 52 is then lifted, the design of the tool of the present invention allows the weight of the fuel assembly 52 to actually increase the gripping force. As the lifting apparatus 20 and fuel assembly 52 thereon are lifted by a lifting means or hoist (not shown) which is operably associated with the lift plate 42 by the bail 29 on the elongated mast 23, the load is distributed along the elongated mast 23 to the lift plate 42, to the gripper rod 56 secured to the lift plate 42, down through the gripper rod 56 and to the first frustoconical surface 59. Since the sleeve 64 has been expanded into contact with the guide thimble 50, this lifting of the gripper rod 56 within the sleeve 64 causes the first frustoconical surface 59 to further engage the second bevelled inside surface 88 of the sleeve 64. Thus, the sleeve 64 would be further radially expanded when the fuel assembly 52 is initially lifted. This unique tool design provides a load path which is a reversal of what is commonly found in conventional tools, in that a conventional tool has the gripping actuator 97 normally attached to the lift plate 42 such that when the tool is lifted, the downward pressure is somewhat released from the gripping actuator 97, causing the sleeve 64 to partially contract. In the redesigned configuration of the present invention, the lifting of the fuel assembly actually causes the gripping force to be increased, thereby positively preventing the fuel assembly from slipping.

Preferably, the tool 20 is made entirely of stainless steel, or some other suitable non-corroding material, since it will be stored under water within the plant's spent fuel pool when not in use in the pool.

A cage assembly, generally designated at 110, is comprised of an elongated cylinder 113 which is concentrically disposed with the mast 23 such that the cylinder 113 is in surrounding relationship with a substantial portion of the mast, the mast 23 being slidably disposed within the cylinder 113. The cage assembly 110 further includes an upper plate 116 fixedly secured to the bottom end of the elongated cylinder 113; the upper plate 116 having a hole therein through which passes the elongated mast 23. A lower frame 119 is disposed beneath the upper plate 116, the frame 119 permitting passage of the fuel assembly gripping means 32 therethrough. Secured between the upper plate 116 and the lower frame 119 are at least two, and preferably four, supporting members 122, the supporting members each having a lower section 123 projecting below the lower frame 119 The elongated cylinder 113 is of a length less than that of the elongated mast 23, thereby defining a mast full-up position 126 and a mast full-down position 128 (which is how the tool is represented in FIG. 1). The cage 110 defines an area into which the fuel assembly gripping means 32 is fully received when the mast 23 is in the full-up position 126. The cylinder 113 has a locking means 131 secured to its top end and operably associated with the mast 23 for preventing relative motion between the mast 23 and the cylinder 113 while the mast is in the full-up position 126.

The lower section 123 of at least one of the supporting members 122 projecting below the lower frame 119 comprises a pin 134 having a bullet-nosed or conical shape 135, which is adapted to be received within an alignment hole 138 of the top nozzle 139 for alignment of the lifting apparatus 20 with a fully loaded fuel assembly 52 having all its fuel rods 141 therein. Since there are typically two such alignment holes 138 in a typical fuel assembly top nozzle 139, it is preferred to have two pins 134 for proper orientation of the tool 20 with respect to the fuel assembly 52. One of the other supporting members 122 consists of an alignment indicator assembly 145 (see FIG. 10) which is comprised of a hollow tube 147 having an indicator rod 148 slidably disposed therein, said indicator rod 148 adapted to contact an upper surface 150 of the top nozzle 139 whereby the indicator rod 148 is forced upward within the hollow tube 147 to project upward above the upper plate 116, when the lower end of the indicator rod 148 is forced upward by the upper surface 150 of the top nozzle 139. The indicator rod 148 pushes up against a cover plate 153 thereby causing it to flip up by means of its being pivoted by pin 154, causing the top surface 156 of the indicator rod 148 to be visible. This top surface 156 of the rod 148 is painted a bright color, preferably yellow, so that it is easily visible by the remote operator to positively indicate to the operator that the pins 134 have been properly received within the alignment holes 138 and the cage assembly 110 has thus been properly aligned on top of the fuel assembly 52. The indicator rod 148 and cover plate 153 are biased in a closed position by means of a compression spring 159 on the lower end of the indicator rod 148 so that the highly visible top surface 156 of the indicator rod 148 is only visible when the tool 20 is in proper position.

Figures 9, 10, 12:
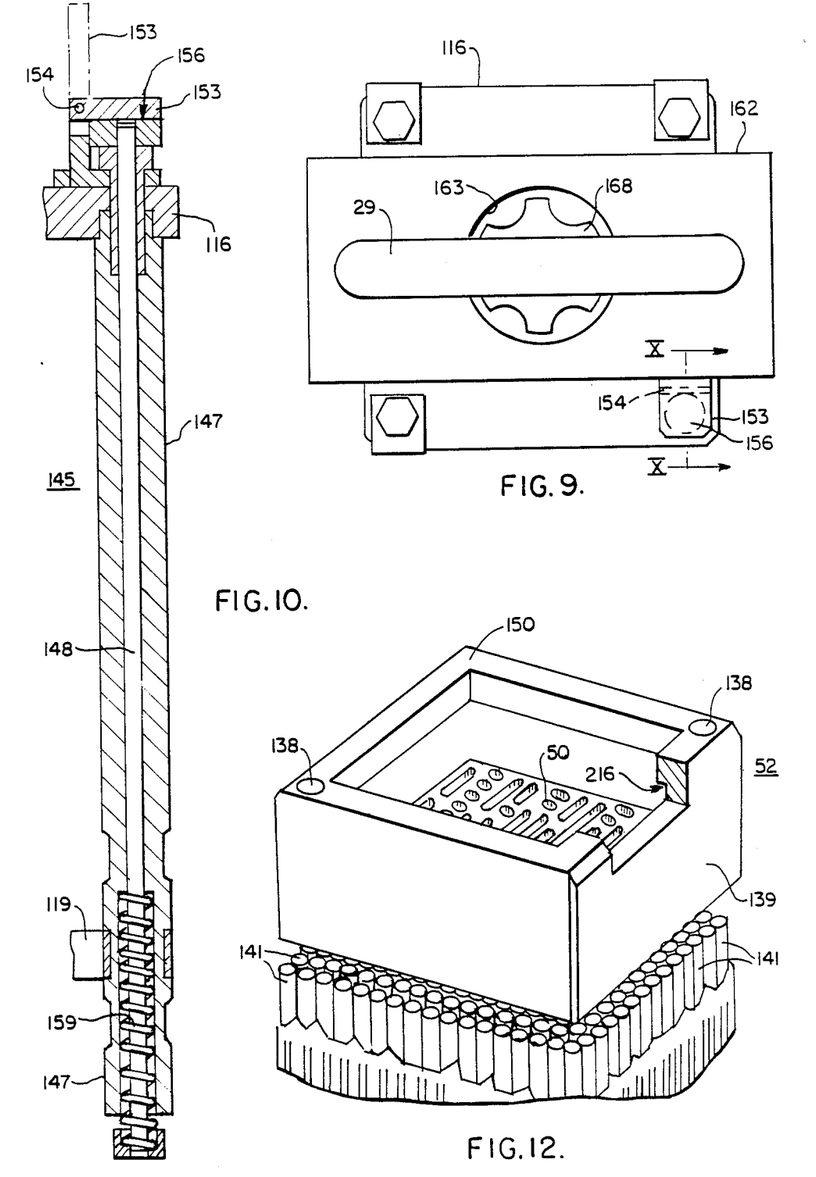
FIG. 9 is a top view of the tool taken along the lines IX—IX of FIG. 1.
FIG. 10 is a sectional view taken along the lines X—X of FIG. 9.
FIG. 12 is a top view of one design of a typical fuel assembly as in FIG. 11, showing the locations of control rod guide tubes therein.

The bail or supporting means 29 is fixedly secured to the upper portion 25 of the elongated mast 23 by means of a bail plate 162 which has a hole 163 therethrough for receiving the upper end of actuating means 35 (See FIG. 9). The actuating means 35 is comprised of an actuator rod 165 rotatably disposed within the mast 23 and extending substantially along its length from the upper portion 25 to the lower portion 26, and has an upper end 166 projecting above the bail plate 162 and passing along the entire length of the mast 23 to the actuating plate 45 of the gripping means 32. A handle or knob 168, at the top of the tool which is rotated by the tool operator to expand the gripping members 49, is operably secured to the actuator rod 165. The lower end of the actuator rod 165 passes through a bushing 169 disposed in a hole within the lift plate 42 and is concentrically disposed within a bearing or Acme screw 171 secured within the actuating plate 45 of the gripper assemblies 32.

The operation of the gripping means 32 is as follows: When the actuator knob 168 is rotated clockwise (in this example), the Acme screw 171 threadingly engaged with the lower end of the actuator rod 165 is translated downward, thereby translating the attached actuating plate 45 downward. The gripper actuator 97 secured to the actuating plate 45 is thusly translated downward such that the second frustoconical surface 101 at its lower end engages the first bevelled inside surface 85 of the sleeve 64. Both the sleeve 64 and the gripper actuator 97 are moved downward such that the second bevelled inside surface 88 of the sleeve 64 contacts the first frustoconical surface 59 of the gripper rod 56. As the actuating plate 48 continues to move downward, the first 59 and second 101 frustoconical surfaces are brought closer together, whereby the interaction of the respective angled surfaces force the sleeve 64 to expand radially outward into gripping relation with the inside diameter of the guide tube 50.

For additional support, a plurality of spacer rods 174 are fixedly attached between the lift plate 42 and a lower plate 177. The actuating plate 45 is disposed between the lift plate 42 and the lower plate 177 in sliding communication with the spacer rods 174. The actuating plate 45 has a bore 180 therethrough adapted to receive the bearing or Acme screw 171 which is threadingly engaged with a threaded portion 182 of the actuator rod 165, whereby the actuating plate 45 is translated upward or downward when the actuator rod 165 is correspondingly rotated with the knob 168. The actuator rod 165 terminates within a sat 186 disposed within the lower plate 177.

A biasing means or spring 189 is disposed between the lower surface of the actuating plate 45 and a washer or shoulder 192 on an upper portion of the gripper actuator 97, thereby biasing the gripper actuator 97 downward. When the gripping members 49 are initially assembled, the gripper rod 56 is secured to the lift plate 42 and the gripper actuator 97 is secured to the actuating plate 45 such that the first frustoconical surface 101 of the tip 107 is just contacting the second bevelled inside surface 88 of the sleeve 64, and the second frustoconical surface 101 of the gripper actuator 97 is contacting the first bevelled inside surface 85 of the sleeve 64. The contact between the respective surfaces is such that, while the sleeve 64 is in contact with both the gripper actuator 97 and the gripper rod 56, it is not expanded beyond its original diameter during this adjustment process.

As a positive release mechanism for the gripping members 49, the gripper actuator 97 has on its lower end above the second frustoconical surface 101 a generally cylindrical outwardly projecting annular flange 104. When the actuator knob 168 is rotated counterclockwise to correspondingly rotate the lower end of the actuator rod 165 within the Acme screw 171, the attached actuating plate 45 is thereby translated upward. As the actuating plate 45 is translated upward, the force on the spring 189 is relieved, thereby pulling the gripper actuator 97 upward; the flange 104 correspondingly moves upward within the sleeve 64, whereby the upper surface 105 of the flange 104 contacts the lower shoulder 82 on the top disc-shaped section 73 of the sleeve 64. As the actuating plate 45 and gripper actuator 97 are continually moved upward, this flange 104 and shoulder 82 interact such that the sleeve 64 is correspondingly pulled upward so that the second frustoconical surface 101 has been moved upward out of engagement with the first bevelled inside surface 85 and the first frustoconical surface 59 is no longer engaging the second bevelled surface 88. As these angled sections are no longer slidingly engaged, the sleeve 64 thereby radially contracts such that it is no longer in gripping relationship with the control rod guide tube 50. With this positive release mechanism, the sleeve 64 will no longer engage the inside diameter of the guide tube 50, which is important if the gripping members 49 have been inadvertently expanded to an extent such that the sleeve 64 would cause an indentation in the guide tube 50. Thus the sleeve 64, by being positively contracted, is moved out of engagement with the guide tube 50 in order that the fuel assembly gripping means 32 can be readily removed from the fuel assembly 52 once it has been transported to the desired location.

Along with the alignment indicator assembly 145 on the upper plate 116, there is provided a separate means whereby the tool operator can determine when the gripping means 32 has been fully translated downward by the elongated mast 23 from the cage assembly 110 and into the fuel assembly 52; that is, into the most full-down position 128. Connected to a lower surface of the lift plate 42, by means such as threaded bolts 199, and downwardly projecting from the lift plate 42 are two stops 200 (see FIG. 5). These stops 200 are oriented on the lift plate 42 such that when the gripping means 32 is moved downward by the elongated mast 23 through the cage assembly 110, the lower surface of the stops 200 will contact the upper surface of the lower frame 119 of the cage assembly 110 when the gripping members 49 are fully inserted within the control rod guide tubes 50, past the area where the crimping has taken place. When the stops 200 encounter the lower frame 119, the operator can feel when the tool 20 has positively stopped. On the upper end of the mast 23 is also included a visual means whereby the operator can determine when the gripping members 49 have been fully inserted within the fuel assemblies 52. A first groove 203 is located on the elongated mast 23 such that when the gripping members 49 have been fully inserted in the fuel assembly 52 in the mast full-down position 128, this groove 203 is level with the top of the cylinder 113.

The fuel assembly gripping means 32 also has associated therewith a gripping indicator means whereby an operator can determine when the actuating plate 45 and gripper actuator 97 have been sufficiently translated downward such that the sleeves 64 of the gripping members 49 are radially expanded into full contact with guide tubes 50. On the upper end of the actuator rod 165 are two grooves 206 and 207, preferably alternately painted red and green, the red groove 206 being disposed below the green groove 207. These grooves are separated by a distance of approximately 13 mm ($\frac{1}{2}$ inch), corresponding to the travel of the actuating plate 45 sufficient for the sleeve 64 to radial expand into a gripping relationship with the guide tube 50. Threadingly engaged with the upper end of the actuator rod 165 and slidably disposed within the mast 23 is an indicator sleeve 210. As the actuator rod 165 is rotated, the indicator sleeve 210, being threadingly engaged therewith, will translate upward or downward corresponding to the same movement of the actuating plate 45. In the non-gripping position, the top surface 211 of the indicator sleeve 210 is even with the green groove 207 on the actuator rod 165. When the knob 168 is turned such that the actuating plate 45 is moved downward in order to put the gripping members 49 in a gripping position, the indicator sleeve 210 also travels downward to uncover the red groove 206. The thread pitch of the indicator sleeve 210 is the same as the thread pitch on the Acme screw 171 at the bottom of the indicator rod 165 such that the indicator sleeve 210 mimics the travel of the actuating plate 45. When the actuating plate 45 has travelled about 13 mm ($\frac{1}{2}$ inch) downward, as indicated by the appearance of the red groove 206 on the actuator rod 165, the sleeve 64 has been radially expanded into contact with the guide tube 50. In this manner, the tool operator has visual verification that the guide tubes 50 have been securely gripped by the gripping members 49. By these three independent means the alignment indicator assembly 145, the two mast full-down position indicators and the gripping indicator means—an operator can readily determine when the tool 20 has been accurately positioned with respect to, and has gripped, the fuel assembly 52 such that the fuel assembly can be safely lifted and transported from one location to another.

The first groove 203 on the elongated mast 23 serves a second safety function when the tool 20 is lifted by the hoist (not shown) which engages the bail 29 to lift the tool 20 and a fuel assembly 52 gripped thereon. As was stated previously, the first groove 203 on the elongated mast 23 is even with the top of the cylinder 113 when the gripping members 49 have been fully inserted within the fuel assembly 52. When the full weight of the fuel assembly 52 is suspended from the tool 20, the operator need only observe this first indicator groove 203. If there is relative motion between the elongated mast 23 and cylinder 113, which would be indicated by the first groove 203 moving upward with respect to the cylinder 113, this means that the gripping members 49 are slipping within the fuel assembly control rod guide tubes 50; the tool 20 and fuel assembly 52 are then set back down and the gripping action performed anew. Thus, the operator can safely transport a fuel assembly 52 knowing that there is no danger of the fuel assembly falling as it is lifted by the tool 20.

Figure 6:
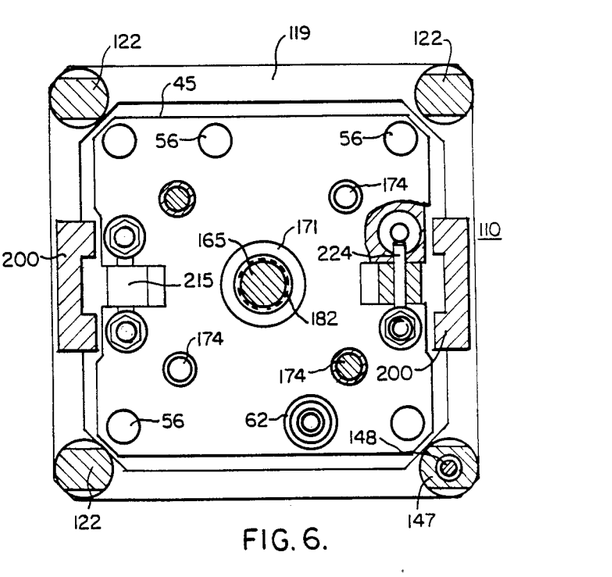
FIG. 6 is a top-sectional view taken along the lines VI—VI of FIG. 2.
Figure 7:
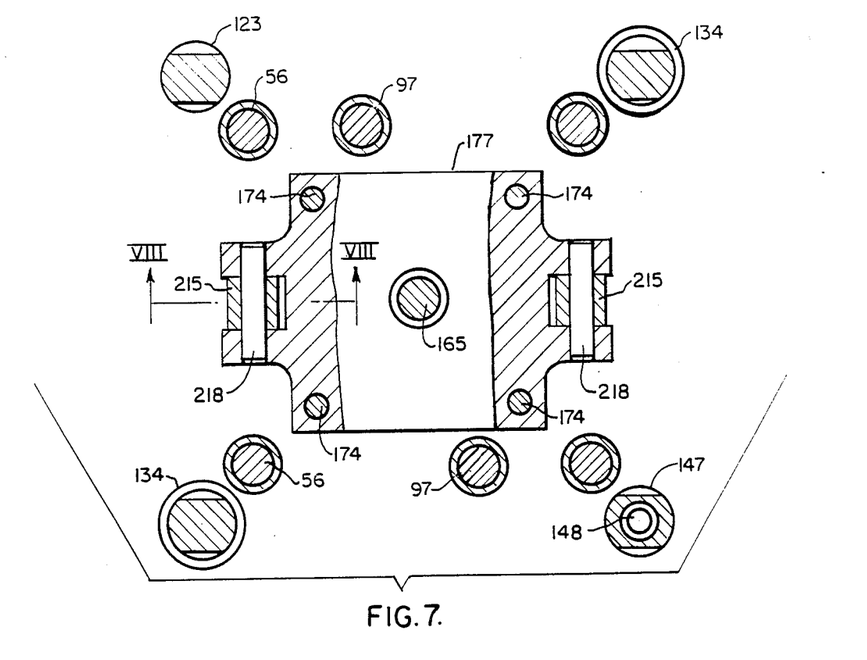
FIG. 7 is a top-sectional view taken along the lines VII—VII of FIG. 2.
Figure 8:
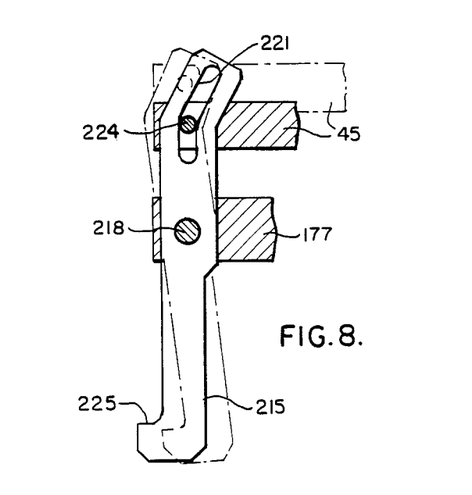
FIG. 8 is a view taken along the lines VIII—VIII of FIG. 7.

As a backup safety feature, the tool 20 has a secondary gripping means designed similar to a conventional fuel assembly gripping means comprised of two fingers 215 which engage a bottom surface of a collar 216 on the top nozzle 139 of the fuel assembly 52. As seen in FIGS. 6–8, the secondary gripping means is comprised of two pivoted gripping fingers 215 which are pivotally pinned 218 near an intermediate section to the lower plate 177. The upper portion of each of said gripping fingers 215 is comprised of a dog-leg shaped member having a correspondingly shaped slot 221 therein. Received in the slot 221 is a pin 224 which is securely fixed to the actuating plate 45. The configuration of the slot 221 and the pin 224 sliding therein is such that as the actuating plate 45 moves downward, and the pin 224 within the associated slot 221, the lower end of each of the actuating fingers 215 is moved outward relative to the fuel assembly gripping means 32 such that a ledge 225 of lower section of the fingers 215 is engaged with the bottom surface of the collar 216 of the top nozzle 139. In this manner, the top nozzle 139 and the fuel assembly are transported as one unit; this secondary feature is important if the crimped section between the top nozzle 139 and the guide tubes 50 are severely corroded. Such severe corrosion could cause the relatively heavy fuel assembly top nozzle 139 to become separated from the fuel assembly 52 itself during transportation. This backup safety feature avoids any potential dangers of a separated top nozzle 139.

Secured to the top of the cylinder 113 is a locking means 131 comprised of toggle clamps 131 (only one of which is shown in FIG. 1) which prevent relative motion between the elongated mast 23 and the cylinder 113 when the gripping means 32 is fully received within an area defined by the cage 110 while the tool is in the mast full-up position 126. The toggle clamps 131 secured on the outside surface of the cylinder 113 have their ends 230 received in corresponding slots or grooves (not shown) within the elongated mast 23. This prevents the tool 20 from "floating" as the tool is moved from fuel assembly to fuel assembly. Thus, the gripping means 32 remains in a stable, relative position with respect to the cage 110, to prevent inadvertent damage to either the tool itself or to other fuel assemblies within the spent fuel pool.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limiting as to the scope of the invention which is to be given the full breadth of the appended claims and in any and all equivalents thereof.

What is claimed is:

1. An apparatus for lifting a fuel assembly of a nuclear reactor, said fuel assembly including a top nozzle and a plurality of control rod guide tubes, the apparatus having a gripping means comprised of:

a lift plate;

an actuating plate having a plurality of apertures, the actuating plate disposed in spaced relationship below the lift plate and vertically movable relative thereto;

a plurality of gripping members operably associated with said lift and actuating plates; said gripping members comprising:

(a) a vertical rod fixedly secured near its top end to said lift plate and projecting downward therefrom through an associated aperture in said actuating plate, said rod having a first frustoconical surface formed near its lower end, (b) a generally cylindrical, elastically deformable vertical sleeve having a bore therethrough with a first inner diameter, said sleeve having a first bevelled inside surface near the top end and a second bevelled inside surface at the bottom end of said sleeve, and (c) a vertical gripper actuator disposed about said rod, said gripper actuator being secured near its upper end to said actuating plate and having a second frustoconical surface formed at its lower end and a generally cylindrical outwardly projecting annular flange having an upper surface disposed above said second frustoconical surface, whereby said sleeve vertically extends generally from the first bevelled inside surface at the second frustoconical surface to the second bevelled inside surface at the first frustoconical surface; and actuating means operably associated with said lift and actuating plates, in such a manner that said gripping members are in a gripping position when the actuating plate is translated downward by the actuating means, and in a release position when the actuating plate is translated upward by the actuating means.

2. The fuel assembly lifting apparatus of claim 1, wherein said sleeve essentially consists of five vertically oriented annular sections:

(i) a top disc-shaped section having a second inner diameter somewhat greater than the first inner diameter;

(ii) a first generally cylindrical section immediately below said disc-shaped section, said first cylindrical section having a third inner diameter greater than the second inner diameter, and thereby defining a lower shoulder on said disc-shaped section at the top of said sleeve;

(iii) the first bevelled inside surface below the first cylindrical section; and (iv) the second bevelled inside surface at the bottom end of said sleeve, thereby defining;

(v) a second generally cylindrical section between said first and second bevelled inside surfaces, said second cylindrical section having a diameter substantially equal to the first inner diameter, whereby said first bevelled inside surface is engaged with the second frustoconical surface and said second bevelled inside surface is engaged with the first frustoconical surface.

3. The fuel assembly lifting apparatus of claim 2, wherein the gripper actuator is vertically slidable with respect to said vertical rod, whereby the gripper actuator is translated downward when the actuating plate is so translated by the actuating means, thereby radially expanding the elastically deformable sleeve by means of said second frustoconical surface slidingly engaging said first bevelled inside surface and said second bevelled inside surface slidingly engaging said first frustoconical surface.

4. The fuel assembly lifting apparatus of claim 3, wherein the sleeve is further radially expanded when the tool is lifted by a lifting means operably associated with the lift plate.

5. The fuel assembly lifting apparatus of claim 3, wherein the first and second frustoconical surfaces and the first and second bevelled inside surfaces each have an included angle of about 16 degrees, whereby said sliding engagement of said respective surfaces results in a radially outward expansive force on the inner surface of said sleeve, thereby radially expanding the outer surface of said sleeve into gripping engagement with the inside diameter of said control rod guide tubes.

6. The fuel assembly lifting apparatus of claim 5, wherein the sleeve has a plurality of radially oriented vertical slits therein, enabling said sleeve to radially expand into a gripping relationship with said control rod guide tubes, said slits ultimately extending from the upper end to about the second bevelled inside surface at the lower end, and from the lower end to about the first bevelled inside surface near the upper end.

7. The fuel assembly lifting apparatus of claim 6, wherein the gripper actuator is translated upward when the actuating plate is so translated whereby said sleeve is pulled upward by means of the upper surface of said annular flange engaging the lower shoulder on said disc-shaped section of said sleeve, thereby disengaging said second frustoconical surface from said first bevelled inside surface, and said second bevelled inside surface from said first frustoconical surface, to allow the sleeve to radially contract and releasably engage said sleeve from said control rod guide tubes.

8. The fuel assembly lifting apparatus of claim 1, wherein the gripper actuator is biased downwardly by means of a spring secured between said actuating plate and a shoulder on said gripper actuator, said shoulder disposed below said actuating plate and above said sleeve.

9. The fuel assembly lifting apparatus of claim 1, wherein the lower end of said vertical rod below said first frustoconical surface terminates in a bullet-nosed tip, said tip thereby facilitating insertion of said gripping members into said control rod guide tubes.

10. The fuel assembly lifting apparatus of claim 1 further including an elongated mast having an upper and lower portion, the lower portion secured to a top surface of the lift plate and a supporting means secured to the upper portion.

11. The fuel assembly lifting apparatus of claim 10, further including a cage assembly which comprises:
 (a) an elongated cylinder concentrically disposed in surrounding relationship with the elongated mast such that said mast is slidably disposed within said cylinder, the cylinder being of length less than that of the mast to thereby define a mast full-up position and a mast full-down position, said cylinder having a locking means secured to its top end operably associated with said mast for preventing relative motion therebetween;
 (b) an upper plate fixedly secured to the bottom end of the elongated cylinder, said upper plate having a hole therein for passage of the elongated mast therethrough;
 (c) a lower frame which permits passage of the fuel assembly gripping means therethrough; and
 (d) at least two supporting members fixedly disposed between the upper plate and the lower frame, said supporting members projecting below the lower frame.

12. The fuel assembly lifting apparatus of claim 11, wherein at least one of said supporting members has a lower section projecting below the lower frame of a conical shape, adapted to be received within an opening of the top nozzle for alignment of the lifting apparatus therewith.

13. The fuel assembly lifting apparatus of claim 12, wherein one of said supporting members consists of an alignment indicator assembly comprised of a hollow tube having an indicator rod slidably disposed therein, said indicator rod adapted to contact an upper surface of the top nozzle whereby said indicator rod is forced upward within the hollow tube to project upward above the upper plate, appearance of said indicator rod thereby indicating when the apparatus has been properly positioned with respect to the fuel assembly to be lifted.

14. The fuel assembly lifting apparatus of claim 1, wherein the fuel assembly gripping means further includes a plurality of spacer rods fixedly attached near one end to said lift plate and fixedly attached near the opposite end to a lower plate disposed in spaced relationship below said actuating plate, the actuating plate further being in sliding communication with said spacer rods.

15. The fuel assembly lifting apparatus of claim 10, wherein the actuating means comprises a vertical actuator rod having a top end projecting above the mast and including a knob secured thereto, the actuator rod extending down through the mast, through a bushing disposed within a hole in the lift plate, the actuator rod having a threaded portion operably associated with a bearing secured to the actuating plate whereby the actuating plate is translated upward or downward by a corresponding rotation of the actuator rod.

16. The fuel assembly lifting apparatus of claim 10, wherein the supporting means further comprises a lifting bail fixedly secured to said upper portion of said elongated mast by means of a bail plate.

17. The fuel assembly lifting apparatus of claim 14, further comprising a feel assembly top nozzle gripping means.

18. The fuel assembly lifting apparatus of claim 17, wherein said top nozzle gripping means secured to opposing sides of the lower plate is comprised of at least two gripping fingers having a dog-leg top portion, said top portion having a corresponding slot therein adapted to slidingly receive a pin being secured to the perimeter of the actuating plate;
 said gripping fingers being pivotally secured to the lower plate at an intermediate portion; and
 said top nozzle gripper fingers each having an outwardly directed ledge at its lower portion adapted to engage a bottom surface of the top nozzle, whereby each gripping finger is pivoted such that as the actuating plate is translated downward, the pin is translated downward in the slot, thereby causing the lower portion to swing outward and into gripping engagement with the top nozzle.

19. The fuel assembly lifting apparatus of claim 12, wherein the elongated mast has a circumferential groove near the top portion, said groove being disposed at a position on the mast which is level with the top of the cylinder when the mast is in the full-down position.

20. The fuel assembly lifting apparatus of claim 15, further including a gripping indicator means whereby it can readily be determined when said gripping members are in a gripping position.

21. The fuel assembly lifting apparatus of claim 20, wherein the gripping indicator means is comprised of two circumferential grooves on the upper end of the actuator rod projecting above the elongated mast and disposed below the actuating knob but above the bail plate, said actuator rod threadingly engaging an indicator sleeve slidably disposed between the mast and the actuator rod whereby the indicator sleeve is translated upward or downward when the actuating rod is correspondingly rotated such that the indicator sleeve mimics the travel of the actuating plate.

22. An apparatus for lifting and transporting a spent fuel assembly of a nuclear reactor, said fuel assembly having a plurality of vertically disposed fuel rods and several control rod guide tubes interspersed among said fuel rods with said control rod guide tubes being secured at either end to a top and bottom nozzle, said apparatus comprising:
   a vertically disposed elongated mast having an upper and lower portion;
   a lifting bail secured to the upper portion by means of a bail plate;
   a cage assembly having an upper plate;
   a fuel assembly gripping means secured to the lower portion of the mast, the gripping means further including
   (a) a lift plate fixedly secured to the mast and disposed below the upper plate, the lift plate having a bushing disposed therein,
   (b) a lower plate disposed in spaced relationship below the lift plate, the lower plate having a seat disposed therein,
   (c) vertically disposed spacer rods secured between the lift plate and the lower plate;
   (d) an actuating plate disposed between said lift and lower plates in sliding communication with said spacer rods, the actuating plate having a bearing disposed within a bore therethrough, and
   (e) vertically disposed gripping members adapted to be received in said control rod guide tubes, said gripping members operably associated with the actuating plate and projecting substantially below the lower plate, wherein said gripping means is substantially received within the cage assembly when in a mast full-up position, and projecting below the cage assembly when in a mast full-down position; and
   means for actuating the fuel assembly gripping means.

23. The apparatus as recited in claim 22, wherein the actuating means includes an actuator rod rotatably disposed within the mast and extending from an upper end projecting above the bail plate, through the bushing of the lift plate, having a portion threadingly engaged with the bearing of the actuating plate whereby the actuating plate is translated upward or downward with a corresponding rotation of the actuator rod, to a lower end disposed within the seat of the lower plate, and a knob secured to the upper end of the actuator rod.

24. The apparatus as recited in claim 22, wherein each of said gripping members is further comprised of:
   a generally cylindrical vertical rod having a first frustoconical surface formed near its lower end, said rod being fixedly secured near its top end to said lift plate and projecting downward therefrom through an associated aperture in said actuating plate;
   a generally cylindrical, elastically deformable vertical sleeve having a bore therethrough with a first inner diameter, said sleeve essentially consisting of five vertically oriented annular sections:
   (a) a top disc-shaped section having a second inner diameter somewhat greater than the first inner diameter;
   (b) a first generally cylindrical section immediately below said disc-shaped section, said first cylindrical section having a third inner diameter greater than the second inner diameter, and thereby defining a lower shoulder on said disc-shaped section at the top of said sleeve;
   (c) a first bevelled inside surface below said first generally cylindrical section;
   (d) a second bevelled inside surface at the
   d) bottom end of said sleeve, thereby defining a second generally cylindrical section between said first and second bevelled inside surfaces, said second cylindrical section having a diameter substantially equal to the first inner diameter; and
   (e) a plurality of radially oriented vertical slits therein, enabling said sleeve to radially expand into a gripping relationship with said control rod guide tubes, said slits ultimately extending from the upper end to about the second bevelled inside surface at the lower end, and from the lower end to about the first bevelled inside surface near the upper end; and
   a generally cylindrical, vertical gripper actuator concentrically disposed about said rod and within said sleeve, said gripper actuator being secured near its upper end to said actuating plate and having a second frustoconical surface formed at its lower end for slidingly engaging said first bevelled inside surface, and a generally cylindrical outwardly projecting annular flange having an upper surface disposed above said second frustoconical surface, whereby said sleeve vertically extends from the top section above the annular flange over the second frustoconical surface to the first frustoconical surface.

25. The apparatus as recited in claim 22, wherein the cage assembly further includes
   (a) an elongated cylinder disposed in surrounding relationship with the mast such that the mast is slidably disposed therein, the cylinder being less in length than the mast and thereby providing for the mast full-up position and the mast full-down position, the cylinder further including two toggle clamps secured to its top end and operably associated with the mast for preventing relative movement therebetween while in the mast full-up position;
   (b) the upper plate fixedly secured to the bottom end of the cylinder, said upper plate having a hole therein for passage of the mast therethrough;
   (c) a lower frame disposed in spaced relationship below the upper plate; and
   (d) at least three cylindrical supporting members fixedly secured between the upper plate and the lower frame, said supporting members having a lower section projecting downward from the lower frame.

26. The fuel assembly lifting apparatus of claim 22, wherein the lower end of said vertical rod below said first frustoconical surface terminates in a bullet-nosed tip, said tip thereby facilitating insertion of said gripper members, into said control rod guide tubes.

27. The fuel assembly lifting apparatus of claim 23, wherein the gripper actuator is vertically slidable with respect to said vertical rod, whereby the gripper actuator is translated downward when the actuating plate is so translated by corresponding rotation of the actuating rod, thereby radially expanding the elastically deformable sleeve by means of said second frustoconical surface slidingly engaging said first bevelled inside surface and said second bevelled inside surface slidingly engaging said first frustoconical surface.

28. The fuel assembly lifting apparatus of claim 27, wherein the first and second frustoconical surfaces and the first and second bevelled inside surfaces each have an included angle of about 16 degrees, whereby said sliding engagement of said respective surfaces results in a radially outward expansive force on the inner surface of said sleeve, thereby radially expanding the outer surface of said sleeve into gripping engagement with the inside diameter of said control rod guide tubes.

29. The fuel assembly lifting apparatus of claim 24, wherein the gripper actuator is translated upward when the actuating plate is so translated whereby said sleeve is pulled upward by means of the upper surface of said annular flange engaging the lower shoulder on said disc-shaped section of said sleeve, thereby disengaging said second frustoconical surface from said first bevelled inside surface, and said second bevelled inside surface from said first frustoconical surface, to allow the sleeve to radially contract and releasably engage said sleeve from said control rod guide tubes.

30. The fuel assembly lifting apparatus of claim 24, wherein the gripper actuator is biased downwardly by means of a spring secured between said actuating plate and a shoulder on said gripper actuator, said shoulder disposed below said actuating plate and above said sleeve.

31. The fuel assembly lifting apparatus as recited in claim 23, wherein two of said supporting members have a lower section comprised of a conical alignment pin adapted to be received within corresponding alignment holes of the top nozzle for alignment of the apparatus therewith.

32. The fuel assembly lifting apparatus as recited in claim 31, wherein one of the other said supporting members consists of an indicator assembly comprised of a hollow tube having an indicator rod slidably disposed therein, said indicator rod adapted to contact an upper surface of the top nozzle whereby the indicator rod is forced upward within the hollow tube to project upward above the upper plate, appearance of said indicator rod thereby indicating when said alignment pins have been properly received with said alignment holes.

33. The fuel assembly lifting apparatus of claim 22, further comprising a top nozzle gripping means secured to opposing sides of the lower plate comprised of two gripping fingers having a dog-leg top portion, said top portion having a corresponding slot therein adapted to slidingly receive a pin being secured to the perimeter of the lift plate;
   said gripping fingers being pivotally secured to the lower plate at an intermediate portion; and
   said top nozzle gripper fingers each having an outwardly directed ledge at its lower portion adapted to engage a bottom surface of the top nozzle, whereby each finger is pivoted such that as the actuating plate is translated downward, the pin is translated downward in the slot, thereby causing the lower portion to swing outward and into gripping engagement with the top nozzle.

34. The fuel assembly lifting apparatus of claim 22, wherein the elongated mast has a circumferential groove near the top portion, said groove being disposed at a position on the mast which is level with the top of the cylinder when the mast is in the full-down position.

35. The fuel assembly lifting apparatus of claim 23, further including a gripping indicator means comprised of two circumferential grooves on the upper end of the actuator rod projecting above the elongated mast and disposed below the actuating knob but above the bail plate, said actuator rod threadingly engaging an indicator sleeve slidably disposed between the mast and the actuator rod whereby the indicator sleeve is translated upward or downward when the actuating rod is correspondingly rotated such that the indicator sleeve mimics the travel of the actuating plate.

* * * * *